(12) United States Patent
Chung

(10) Patent No.: US 7,073,525 B2
(45) Date of Patent: Jul. 11, 2006

(54) MULTI-TANK CONNECTING DEVICE FOR LIQUEFIED PETROLEUM INJECTION VEHICLE

(75) Inventor: Chan-Bok Chung, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 185 days.

(21) Appl. No.: 10/750,688

(22) Filed: Dec. 31, 2003

(65) Prior Publication Data

US 2005/0061365 A1    Mar. 24, 2005

(30) Foreign Application Priority Data

Sep. 22, 2003    (KR) ............... 10-2003-0065541

(51) Int. Cl.
*F16K 17/36*    (2006.01)
(52) U.S. Cl. .................. 137/38; 137/265; 137/571
(58) Field of Classification Search .......... 137/38, 137/265, 571
See application file for complete search history.

(56) References Cited

U.S. PATENT DOCUMENTS 1,545,996 A * 7/1925 Askren ................. 137/38
2,332,007 A * 10/1943 Parker ................. 137/38
2,973,121 A * 2/1961 Banker ................ 222/135
3,021,855 A * 2/1962 Cartwright et al. ........ 137/38
3,825,027 A * 7/1974 Henderson .............. 137/265
4,664,144 A * 5/1987 Lemmon ............... 137/571

FOREIGN PATENT DOCUMENTS

| DE | 101 46 051 B4 | 10/2002 |
| DE | 202 09 413 U1 | 10/2002 |
| EP | 0 241 862 A2 | 10/1987 |
| JP | 09-104285 | 4/1997 |
| JP | 2002-084549 | 3/2002 |

* cited by examiner

*Primary Examiner*—Stephen M. Hepperle
(74) *Attorney, Agent, or Firm*—Morgan Lewis & Bockius LLP

(57) ABSTRACT

A multi-tank connecting device has a main tank with a fuel pump and one or more auxiliary tanks. A fuel pipe connects the main tank and the auxiliary tank and allows fuel to flow between the main tank and the auxiliary tank. A fuel isolating device closes the fuel pipe when the vehicle ascends or descends a slope. The auxiliary tank is disposed lower than the main tank. The fuel isolating device includes a ball, a panel attached to a rod, a spring attached to the panel, a switch, a throttle valve actuator, and a throttle valve.

2 Claims, 2 Drawing Sheets

MULTI-TANK CONNECTING DEVICE FOR LIQUEFIED PETROLEUM INJECTION VEHICLE

CROSS-REFERENCE TO RELATED APPLICATIONS

This application claims priority to Korean Application No. 10-2003-0065541, filed on Sep. 22, 2003, the disclosure of which is incorporated fully herein by reference.

FIELD OF THE INVENTION

The present invention relates to a Liquefied Petroleum Injection (LPI) vehicle mounted with a plurality of tanks. More particularly, the present invention relates to a device connecting the plurality of tanks to enable the fuel to flow between the plurality of tanks.

BACKGROUND OF THE INVENTION

In Liquefied Petroleum Gas (LPG) vehicles, the LPG provided from a tank is typically injected in a gaseous state to the engine through a vaporizer and a mixer. However, LPG vehicles having the system described above have many drawbacks relating to engine output, fuel consumption, starting at low temperatures, engine exhaust gas, and the like. Thus, vehicles using LPI systems have recently been developed.

In LPI vehicles, the liquefied petroleum (LP) is injected by using a fuel pump built into the tank, and the injector injects the fuel in a liquid state into the engine. This results in excellent engine output, fuel consumption, starting at low temperatures, engine exhaust gas, and the like. LPI vehicles generally require a plurality of tanks, and the fuel pump is attached only to one of the plurality of tanks. The remaining tanks provide fuel via the tank attached to the fuel pump. The drawback of this configuration is that when the LPI vehicle mounted with a plurality of tanks ascends or descends a slope without sufficient fuel, the fuel flows downward and becomes concentrated in only one tank, which usually is not the tank attached to the fuel pump. This causes a shortage of fuel in the fuel pump-attached tank, which, in turn, causes a shortage of fuel to the engine.

SUMMARY OF THE INVENTION

The present invention provides a multi-tank connecting device for an LPI vehicle adapted to collect fuel in a fuel pump-attached tank when the LPI vehicle mounted with a plurality of tanks ascends or descends on a slope, thereby preventing a fuel cut off phenomenon of the engine. The multi-tank connecting device for an LPI vehicle comprises a main tank having a fuel pump therein and one or more auxiliary tanks. A fuel pipe connects the main tank and the auxiliary tank that allows the fuel to flow between the main tank and the auxiliary tank. A fuel isolating device closes the fuel pipe when a vehicle ascends or descends on a slope and the auxiliary tank is positioned lower than the main tank. The present invention further comprises an auxiliary fuel pipe connecting the main tank and the auxiliary tank and disposed higher than the fuel pipe.

The fuel isolating device is composed of a housing including a passage slanted at a certain degree and containing a ball. A panel is slidably installed in the passage and is attached in the rear to a rod. A spring is attached to the panel to return the panel to its original position when the panel is not contacting the ball. A switch that contacts the rod controls activation of the fuel isolating device ("on" state) when the ball applies pressure to the panel as the vehicle ascends or descends on a slope. A throttle valve opens and closes the fuel pipe. A throttle valve actuator closes the fuel pipe by activating the throttle valve when the switch is turned on.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

The preferred embodiment of the present invention will now be described in detail with reference to the accompanying drawings.

Figure 1:
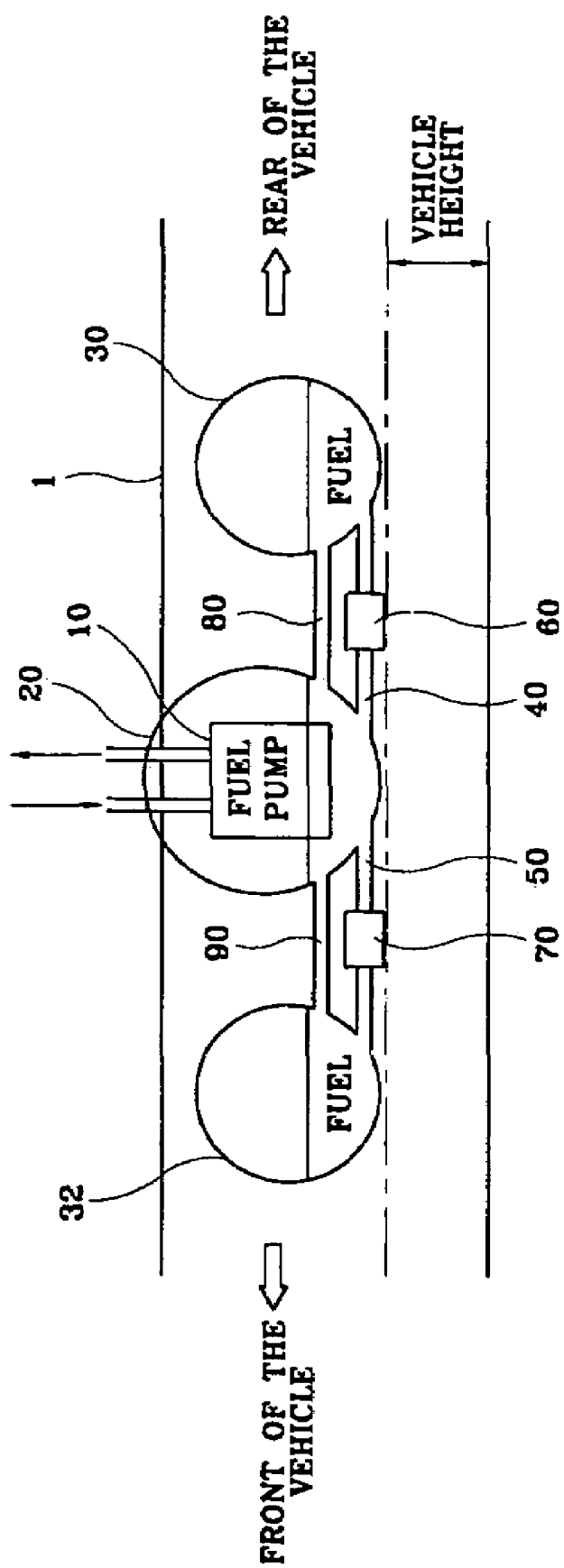
FIG. 1 shows the structure of a multi-tank connecting device for an LPI vehicle according to an embodiment of the present invention.

To achieve a minimal vehicle height as well as a low floor panel 1 of an LPI vehicle, the required fuel capacity cannot be satisfied by using only one tank. Thus, an LPI vehicle, according to an embodiment of the present invention as shown in FIG. 1, comprises main tank 20 having a fuel pump 10 and two auxiliary tanks 30 and 32.

Main tank 20 and auxiliary tanks 30 and 32 are respectively connected via fuel pipes 40 and 50, allowing fuel to flow between the three tanks. Fuel pipes 40 and 50 include fuel isolating devices 60 and 70, respectively. When one of the two auxiliary tanks 30 and 32 is positioned lower than main tank 20 as a vehicle ascends or descends on a slope, the fuel pipe connecting the relevant auxiliary tank and the main tank 20 is closed by the isolating device.

When auxiliary fuel pipes 80 and 90 connect main tank 20 and auxiliary tanks 30 and 32 at a higher position than fuel pipes 40 and 50, and a sufficient amount of fuel is in the tanks, fuel flow is improved between each tank 20, 30, and 32. Further, when the vehicle's fuel is not low, auxiliary fuel pipes 80 and 90 facilitate movement of fuel between the tanks.

Figure 2:
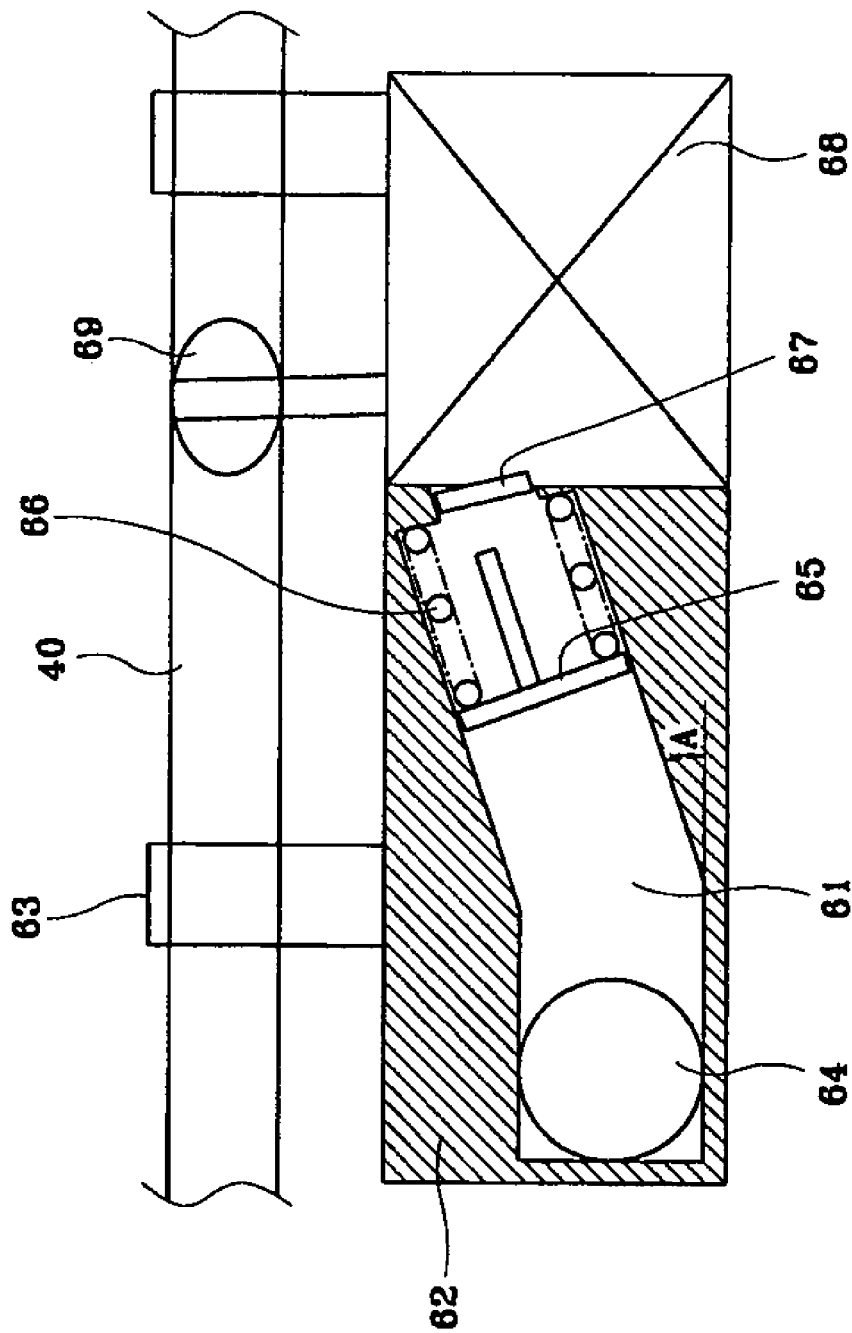
FIG. 2 is a detailed view of a fuel isolating device.

Referring to FIG. 2, fuel isolating devices 60 and 70 mounted at fuel pipes 40 and 50 are identical in shape but are placed in opposing directions to each other (i.e., the two fuel isolating devices 60 and 70 are mounted so that the ends with the balls face each other and the ends with the panels face away from each other). As shown in FIG. 2, housing 62 includes passage 61 and is fixed to fuel pipe 40 via bracket 63. Passage 61 is formed at a certain incline (A=11.3°). Ball 64 is placed at a lower side in passage 61, while panel 65 formed at the rear side with a rod is slidably disposed at an upper side in passage 61. Spring 66 positioned in passage 61 and attached to panel 65 to return panel 65 toward the ball 64.

The upper side of passage 61 includes a switch 67 that activates throttle valve actuator 68. If a vehicle ascends or descends on a slope, causing ball 64 to roll toward and apply pressure to panel 65, the rod of panel 65 contacts switch 67, and throttle valve actuator 68 is turned. Once switch 67 is turned on, throttle valve actuator 68 activates throttle valve 69 mounted on fuel pipe 40 and closes fuel pipe 40.

Referring to FIG. 1, when an LPI vehicle having insufficient fuel (approximately 10% or less of the tank capacity) moves on an ascending slope (e.g. 11.3° or more), the fuel of main tank 20 and auxiliary tank 32 flows into auxiliary tank 30. Fuel isolating device 60 mounted on fuel pipe 40 stops the fuel, which flows to auxiliary tank 30 when the vehicle moves on an ascending slope, thereby preventing fuel shortage in main tank 20. Provided that the LPI vehicle ascends on a slope, ball 64 of the fuel isolating device 60 presses the panel 65, and switch 67 turns on by being contacted with the rod of panel 65. Throttle valve actuator 68 activates throttle valve 69 mounted on fuel pipe 40 and closes fuel pipe 40, thereby stopping the fuel flow through fuel pipe 40.

When the LPI vehicle moves on a flat surface, ball 64 of fuel isolating device 60 shifts to its initial position, and the rod of panel 65 is separated from the switch 67, and thus the switch 67 is turned off. Throttle valve actuator 68 activates throttle valve 69 and opens fuel pipe 40. Thus, the fuel can flow through fuel pipe 40.

On the other hand, if the LPI vehicle, having insufficient fuel (approximately 10% or less of the tank capacity), moves on a descending slope (e.g. 11.3° or more), the fuel of main tank 20 and auxiliary tank 30 flows to auxiliary tank 32. Once fuel isolating device 70 mounted on fuel pipe 50 stops fuel flow toward auxiliary tank 32, fuel shortage resulting from a lack of fuel in main tank 20 can be prevented.

In the above described embodiment of the present invention, two auxiliary tanks are used. However, the number is not limited as long as the tank connecting device of the present invention is applied in an LPI vehicle using at least one auxiliary tank.

As apparent from the foregoing, there is an advantage in the present invention, in that the fuel isolating devices prevents fuel shortage in a main tank of an LPI vehicle when the vehicle ascends or descends a slope.

The invention claimed is:

1. A multi-tank connecting device for an LPI vehicle, comprising:
   a main tank having a fuel pump therein;
   one or more auxiliary tanks;
   a fuel pipe connecting said main tank and said auxiliary tank that allows fuel to flow between said main tank and said auxiliary tank; and
   a fuel isolating device closing said fuel pipe when the vehicle ascends or descends on a slope and said auxiliary tank is disposed lower than said main tank, wherein said fuel isolating device comprises:
      a housing containing a passage slanted at a certain degree;
      a ball placed inside said passage;
      a panel slidably installed in said passage and attached at the rear to a rod;
      a spring returning said panel toward said ball;
      a switch that, when contacting said rod, due to said ball's rolling onto and applying pressure on said panel when the vehicle ascends a slope, turns on;
      a throttle valve configured to open and close said fuel pipe; and
      a throttle valve actuator closing said fuel pipe by activating said throttle valve when said switch is turned on.

2. The device in claim 1, wherein an auxiliary fuel pipe connecting said main tank and said auxiliary tank is disposed higher than said fuel pipe.

* * * * *